United States Patent [19]  
Benesh

[11] 4,359,311  
[45] Nov. 16, 1982

[54] WIND TURBINE ROTOR

[76] Inventor: Alvin H. Benesh, 120 S. Adams Ave., Pierre, S. Dak. 57501

[21] Appl. No.: 267,006

[22] Filed: May 26, 1981

[51] Int. Cl.³ .............................................. F03D 3/06
[52] U.S. Cl. .......................... 416/197 A; 416/DIG. 2
[58] Field of Search ....... 416/197 A, DIG. 2, DIG. 9

[56] References Cited

U.S. PATENT DOCUMENTS 2,252,788  8/1941  Sparr ............................. 416/197 A
4,005,947  2/1977  Norton ........................... 416/197 A
4,177,009 12/1979  Baum et al. ................. 416/197 A X

FOREIGN PATENT DOCUMENTS 601266  2/1926  France .......................... 416/DIG. 9
727519  6/1932  France .......................... 416/197 A
797106  4/1936  France .......................... 416/197 A
596447  3/1978  Switzerland .................. 416/DIG. 6
647938 12/1950  United Kingdom ............... 415/4 R Primary Examiner—Everette A. Powell, Jr.
Attorney, Agent, or Firm—Merchant, Gould, Smith, Edell, Welter & Schmidt

[57] ABSTRACT

A turbine apparatus for utilization of the kinetic energy of moving air or fluid is disclosed. The turbine apparatus is comprised of a rotor (20) mounted for rotation about a central axis (21) with respect to a support member (22) and connected to means (23) for converting rotation of the rotor (20) to usable energy. The rotor (20) includes a plurality of blades (40, 41, 42) disposed symmetrically about the central axis (21), each of the blades having an outer edge (43) and an inner edge (44) with respect to the central axis (21). In addition, each blade (40, 41, 42) has a curved portion (45) and a second portion (46), the curved portion (45) beginning at the outer edge (43) and terminating at the second portion (46). The curved portion (45) has a surface generally concave with respect to the central axis (21). The second portion (46) extends from the curved portion (45) and terminates at the inner edge (44). The inner edge lies in a plane containing the central axis, the plane being disposed at an angle greater than 60° measured about the central axis (21) from a plane containing the outer edge (43) and the central axis (21). Variations of these and other components of the present invention are also described.

11 Claims, 7 Drawing Figures

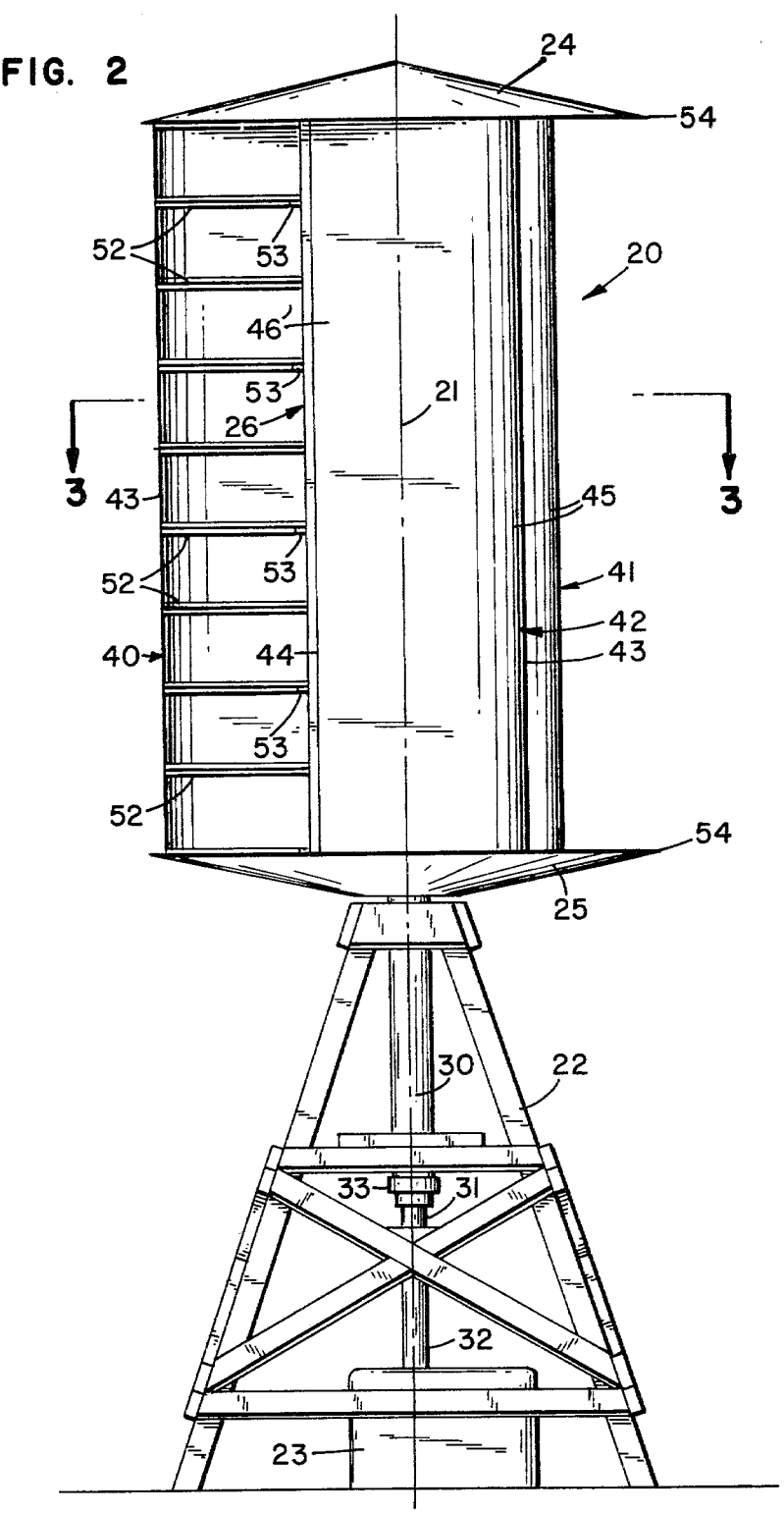

WIND TURBINE ROTOR

TECHNICAL FIELD

The present invention relates to the field of turbine devices and particularly to wind turbines having a vertical axis of rotation.

BACKGROUND OF THE INVENTION

The wind has for a long time been one of the sources of power of which man can avail himself. While not always present at a given site and while a widely varying force from interval to interval, the wind has been used to drive mills and pumps, and for many other purposes.

The better known form of windmill, the propeller-type, has a plurality of blades or vanes rotating about a horizontal axis. Such an arrangement can be quite efficient as long as the axis of rotation is aligned with the wind direction, but for practical utility the windmill must be provided with means for changing the direction of the axis as wind direction changes or must have "sails" of such size that a useful component of power can be derived even from winds of less favorable direction. Large propeller-type windmills cannot be built in areas where there is considerable turbulence, with quick changes in direction and force of the wind. Also, in populated areas the large propeller type may not be considered environmentally desirable, principally because of fear that the high-speed rotor blades may pose safety problems, and also because it has been discovered that the high-speed blades of giant windmills often create eddies in the wind that travel considerable distances, rattling windows in houses.

A second form of windmill, the turbine type, has buckets or blades arranged for unitary rotation about a central vertical axis, and hence is operated by wind from any direction. An early teaching of this, having two diametrically oriented buckets, is shown in Savonius U.S. Pat. No. 1,697,673. The structure is not so efficient as those with a horizontal axis, and also presents problems due to the use of only two blades. These problems include the presence of considerable vibration and the presence of considerable variation in starting torque for different angles of approach of the wind to the stationary rotor.

Attempts have been made to overcome the vibration problem by the use of a turbine having three blades symmetrically disposed about a central vertical axis. However, while more stable, the three blade turbines tended to be even more inefficient than the two blade turbine of the Savonius type. The Czernow French Pat. No. 727,519 shows a three bladed vertical axis wind turbine. Each blade is shown as having a curved portion and a planar portion; however, the straight portion of the blade is relatively short compared with the overall turbine dimensions. The Czernow turbine is rather inefficient principally because of the relatively short length of the planar portion of the blades.

Another teaching of a three bladed vertical axis wind turbine is the Norton U.S. Pat. No. 4,005,947. Norton illustrates embodiments of tubines having both two and three curved outer blades and correspondingly two or three curved inner blades. The outer blades have no straight or planar portion. The ends of the outer blades near the center of the rotor in the three blade configuration point almost straight at the rotor center, and are almost at right angles to the inner ends of the blades of my invention. The Norton invention is also not very efficient.

From the above teachings, it appeared as though the efficiency of the two blade turbine would have to be sacrificed if the stability and endurance of a three blade turbine was desired.

SUMMARY OF THE INVENTION

The present invention relates to a turbine apparatus for utilization of the kinetic energy of moving air or fluid. The turbine has a rotor mounted on a support member for rotation about the rotor's central axis. The rotor has a plurality of blades disposed symmetrically about the central axis, each of the blades having an inner edge and an outer edge with respect to the rotor's central axis. The blades also comprise a curved portion and a second portion. The curved portion begins at the outer edge and terminates at the second portion, defining a surface generally concave with respect to the central axis. The second portion is substantially planar in the preferred embodiment and extends from the curved portion to the inner edge, the inner edge lying in a first plane containing the central axis, the first plane forming an angle greater than 60° with a second plane containing the outer edge and the central axis. The rotor is connected to a means for converting the rotation of the rotor to usable energy.

The present invention also relates to a turbine apparatus for utilization of the kinetic energy of moving air or fluid having a rotor mounted on a support member for rotation about the rotor's central axis. The rotor is shown as having a plurality of blades disposed symmetrically about said central axis, each of the blades having an inner edge and an outer edge with respect to the central axis and having a curved portion and a second portion. The curved portion begins at the outer edge and terminates at the second portion and defines a surface generally concave with respect to the central axis and having a radius of curvature which becomes progressively less from the outer edge to the second portion. The second portion extends from the curved portion and terminates at the inner edge. The rotor is connected to a means for converting the rotation of the rotor to usable energy.

In addition, the present invention relates to a turbine having a plurality of blades disposed symmetrically about said central axis and having an inner vane structure with a plurality of vanes symmetrically disposed about the central axis. The inner vanes cooperate with the outer blades to define air flow paths through the rotor.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals indicate corresponding parts throughout the several views.

FIG. 2 is a view in elevation of a wind turbine installation embodying the invention;

DETAILED DESCRIPTION OF THE INVENTION

Figure 1:
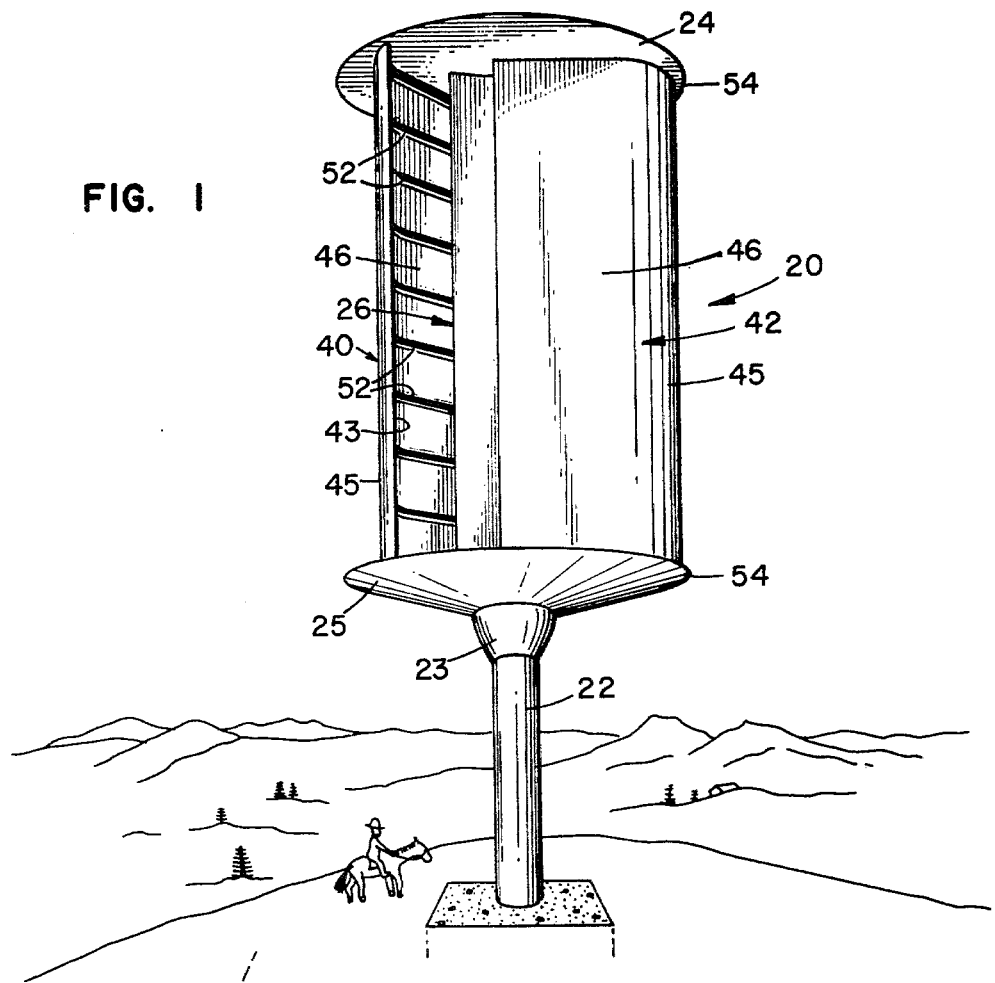
FIG. 1 is a view in perspective of an installation embodying the invention suggesting that the invention may be utilized in very large installations.

A preferred embodiment of a turbine apparatus embodying my invention comprises a rotor 20 mounted for rotation about a central axis 21 with respect to a support member 22 and connected to means 23 for converting rotation of rotor 20 to usable energy.

For purposes of ease of illustration, central axis 21 of the preferred embodiment is described as being vertical; however, this is not meant to preclude the turbine apparatus from having a different axis of orientation. In addition, the turbine described herein is a wind turbine; however, the invention disclosed is meant to have application to many mediums and should not be considered as being limited solely to the wind.

Rotor 20 includes a circular upper end cap 24 and a circular lower end cap 25 interconnected by an inner vane structure 26 and a plurality of blades 40, 41 and 42, blades 40, 41 and 42 being disposed symmetrically about central axis 21.

The preferred embodiment is described as having three blades 40, 41, and 42, but this should not preclude a plurality of blades in varying numbers, and the preferred embodiment is described as having inner vane structure 26 but this does not preclude the turbine apparatus from functioning without inner vane structure 26.

Rotor 20 may be arranged for rotation with respect to a support member 22 in any suitable fashion. By way of illustration (referring to FIGS. 2 and 3), a hollow support shaft 30 may be firmly fixed in support member 22, the shaft 30 projecting vertically upward through an opening 66 in the inner vane structure to the upper end cap 24. The weight of rotor 20 may be carried on shaft 30 at its upper end by a suitable thrust bearing in upper end cap 24 or by bearings in the inner vane structure 26. Rotation of rotor 20 may be transmitted through shaft 30 by a torque tube 31 connected to a driving shaft 32 of means 23. A flexible coupling 33 may be provided as needed. Other conventional support structures of varying designs may be desired depending on the size of rotor 20. If the turbine rotates about shaft 30 (as in this case), shaft 30 should be slightly smaller than the opening 66 in the inner vane structure 26 through which it projects, so that there will not be friction against the inner surfaces of the inner vane structure 26.

Each blade 40, 41 and 42 has an outer edge 43, which is sharply pointed to provide better aerodynamic characteristics for blades 40, 41 and 42, and an inner edge 44 with respect to central axis 21. In addition, each blade 40, 41 and 42 has a curved portion 45 and a second portion 46. In a preferred embodiment second portion 46 is substantially planar; however, second portion 46 may have a slight curvature defining a concave surface with respect to central axis 21. Curved portion 45 defines a surface generally concave with respect to central axis 21 and extends from outer edge 43 to second portion 46. Second portion 46 extends from curved portion 45 to inner edge 44.

Outer edge 43 of each blade 40, 41 and 42 lies on the circumference of a circle 50 of diameter $D_1$ whose magnitude is variable since it is contemplated rotor 20 may be constructed in various sizes ranging from a few feet to considerably over a hundred feet. Circle 50 is centered on central axis 21 and defines an outer periphery, also referenced as 50, of blades 40, 41, and 42. Note, that for purposes of this specification, measurements of the preferred embodiment will be provided for purposes of illustration only and will be expressed in terms of diameter $D_1$ of circle 50.

Each blade 40, 41 and 42 is reinforced by a plurality of vertically spaced ribs 52. Orientation of blades 40, 41 and 42 is maintained by a plurality of vertically spaced members 53 connected to inner vane structure 26. Each blade 40, 41 and 42 is attached to upper 24 and lower 25 end caps. End caps 24 and 25 have an outer periphery 54 which forms a circle, also referenced as 54, of diameter $D_2$ which in a preferred embodiment is $1.05D_1$. Circle 54 is centered on central axis 21.

Inner vane structure 26 comprises a plurality of vane portions 60, 61 and 62 disposed about central axis 21. The vane portions 60, 61 and 62 form three vertical planar portions extending generally outward from the central axis 21. In a preferred embodiment, the vane portions 60, 61 and 62 are disposed symmetrically about central axis 21 and appear in the horizontal cross section as extended sides of an equilateral triangle 63 centered about central axis 21. Vane portions 60, 61 and 62 are affixed to corner post members 64, which extend vertically the entire length of the turbine. The inner vane structure 26 is secured to caps 24 and 25. Inner vane portions 60, 61 and 62 may be interconnected by fairing pieces 65 which are curved and convex with respect to central axis 21. Since the equilateral triangle 63 portion of the inner vane structure 26 is subjected to much stress, particularly twisting stress, equilateral triangle 63 portions should be ruggedly constructed.

Each of vane portions 60, 61 and 62 has an outer edge 68 which lies on a circumference of a circle 69 of diameter $D_3$ which in a preferred embodiment is $0.44 D_1$. The size of the equilateral triangle 63 is defined by a circle 70 of diameter $D_4$ which in a preferred embodiment is $0.1D_1$. Both circles 69 and 70 are centered on a central axis 21. Circle 70 is tangent to inner vane portions 60, 61 and 62 at the inner surfaces of said vane portions 60, 61 and 62.

Figure 3:
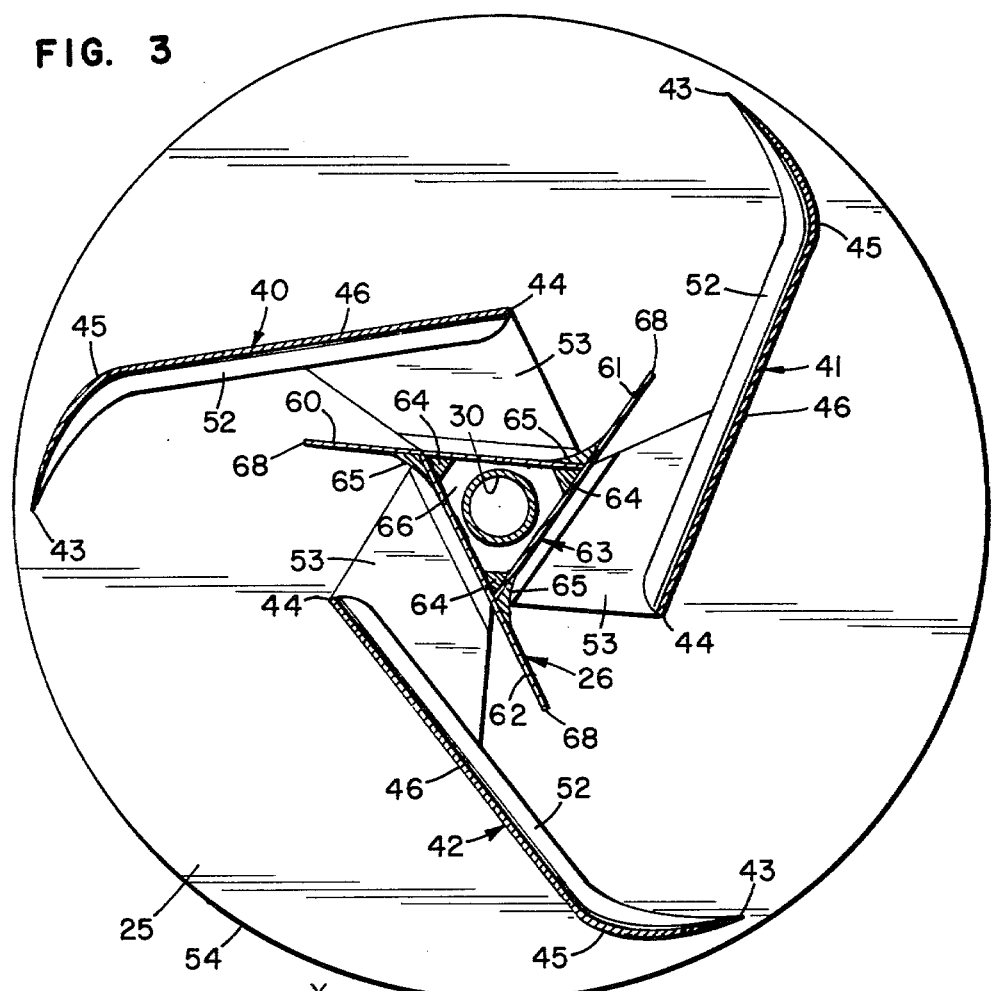
FIG. 3 is a horizontal section along the line 3—3 of FIG. 2.
Figure 5:
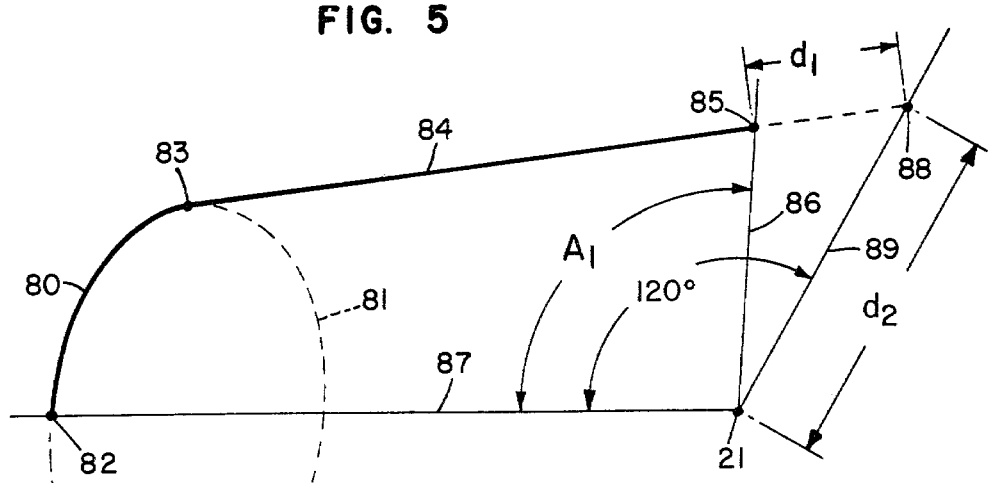
FIG. 5 shows the horizontal cross section geometric layout for a blade.
Figure 4:
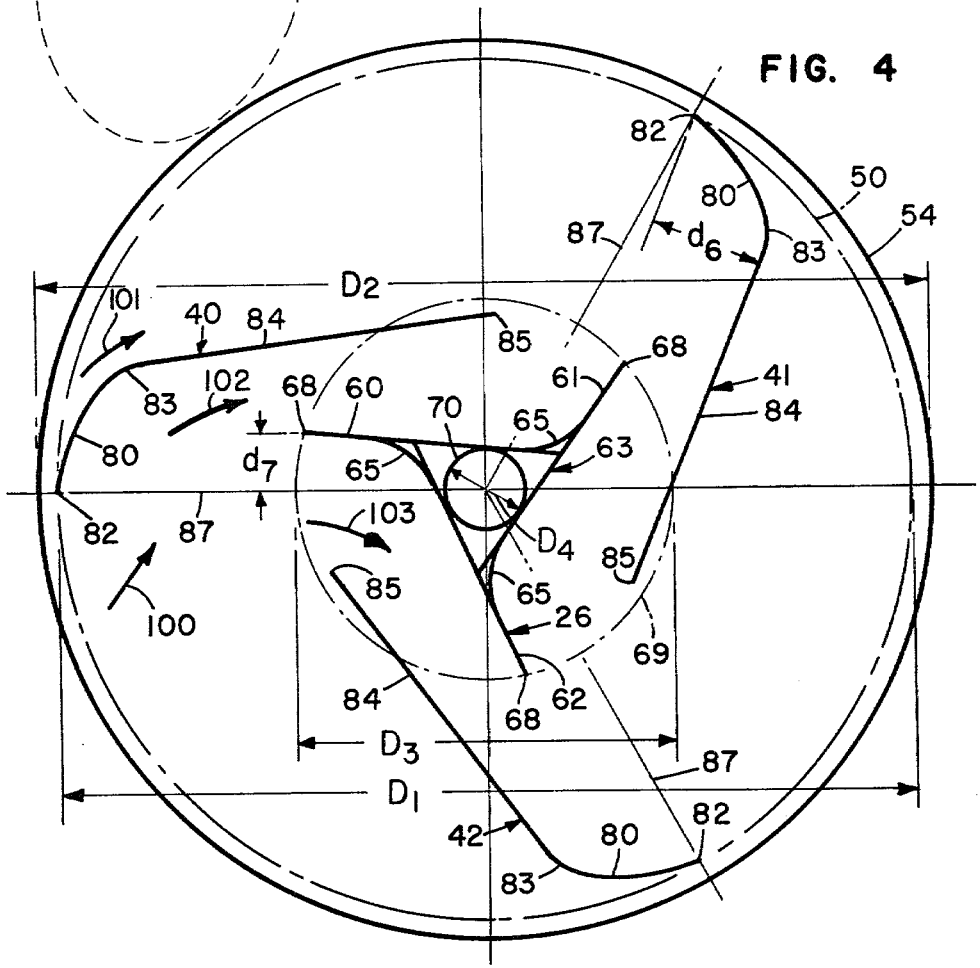
FIG. 4 is similar to FIG. 3 but shows the geometric layout for inner vane structure and the blades.

The geometric configuration of a preferred embodiment of the blades 40, 41 and 42 will now be explained, referring specifically to FIGS. 3, 4 and 5. The curved portion 45 of each blade 40, 41 and 42 forms, in the horizontal cross section, a curve 80 which extends from a point 82 at the outer edge 43 of each blade 40, 41 and 42 to a point 83 where the curved portion 45 is tangent to the substantially planar second portion 46, which lies in a vertical plane illustrated by line 84. Note, line 84 may have a slight curvature whose radius of curvature is greater than $0.5D_1$. Second portion 46 terminates at the inner edge 44 which is illustrated in the horizontal cross section as point 85. Inner edge 44 lies in a vertical plane containing central axis 21, the vertical plane represented in the horizontal cross section by line 86 between point 85 and central axis 21. Line 86 defines an angle $A_1$ with respect to a radius line 87, which extends from central axis 21 to point 82 at outer edge 43 of each blade 40, 41 and 42 and which represents in the horizontal cross section a vertical plane containing outer edge 43 and central axis 21. Angle $A_1$ in one preferred embodiment is approximately 94°, but in any event is preferably greater than 60°. Point 85 is a distance $d_1$, which in a preferred embodiment is $0.115D_1$ from a point 88 lying on a radius line 89, which connects central axis 21 and outer edge 43 of an adjacent blade 40, 41 and 42 and which makes an angle of 120° with radius line 87. Point 88 is spaced from central axis 21 by a distance $d_2$, which in a preferred embodiment is $0.25D_1$. Note, that lines 84 and 87 in the preferred embodiment illustrated are not parallel and if extended beyond periphery 50 of blades 40, 41, and 42 would converge and intersect, however, lines 84 and 87 may be parallel or may diverge beyond the periphery 50.

Figure 7:
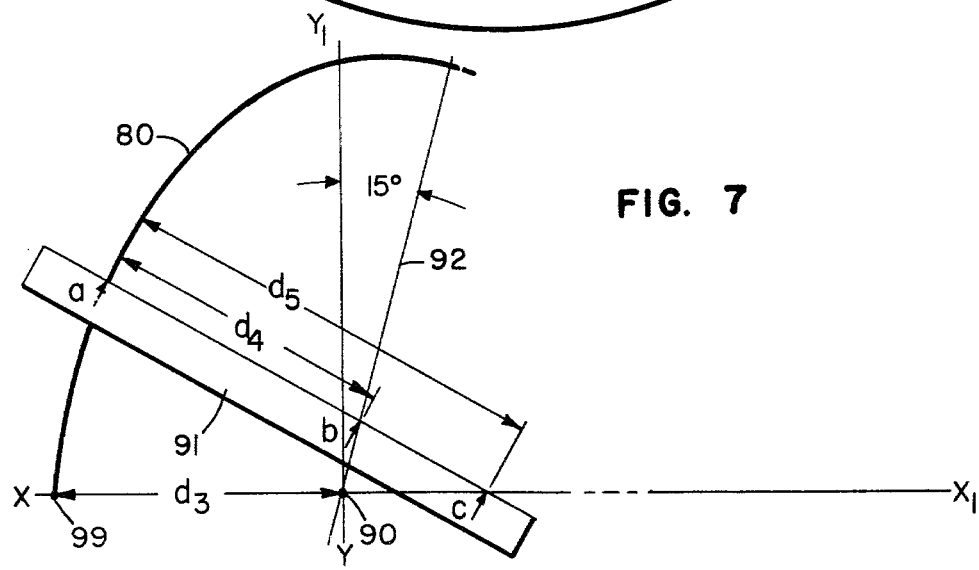
FIG. 7 illustrates a method for tracing the curved portion of the blades.

A pragmatic way of defining a profile of the curved portion 45 of blades 40, 41 and 42 is illustrated in FIG. 7. Curve 80, which represents curved portion 45 in the horizontal cross-section, is nearly one quadrant of a skewed ellipse 81 (FIG. 5) whose major axis is one and one-half times its minor axis and whose major axis is on a 15° skew. Curve 80 is drawn by defining an axis $X-X_1$, which is at right angles to an axis $Y-Y_1$ and which passes through central axis 21 of rotor 20. A point 90 and a point 99 are located on axis $X-X_1$ such that point 90 is a distance $d_3$, which in a preferred embodiment would be 0.1 $D_1$, from point 99. Distance $d_3$ represents one-half the minor axis of skewed ellipse 81. A straight edge 91 is marked with graduations a, b, and c such that the distance from a to b is $d_4$, which in a preferred embodiment is 0.1 $D_1$, and the distance from a to c is $d_5$, which in a preferred embodiment is 0.15 $D_1$ and which represents one-half the major axis of skewed ellipse 81. A line 92 is drawn through point 90 such that line 92 forms an angle of 15° with axis $Y-Y_1$ which also extends through point 90. Straight edge 91 is positioned and repositioned several times such that graduation b remains on line 92 and graduation c remains on axis X-X' at all times. The resulting positions of a are plotted to give the ellipse curve 80, which may be described as a portion of skewed ellipse 81 and which, in the horizontal cross-section, comprises the profile of the outer convex side of the curved portion 45 of blades 40, 41, and 42.

Figure 6:
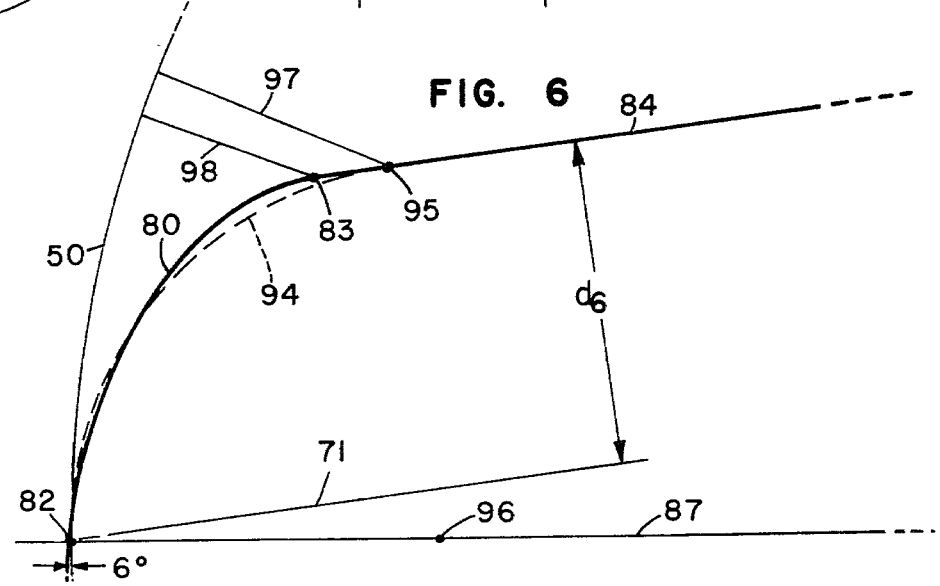
FIG. 6 illustrates geometrically the different point of tangency of a circular arc and the curved portion of the blades with the second portion of the blades.

FIG. 6 shows curve 80 formed by the curved portion 45 of blades 40, 41 and 42 as having its point of tangency 83 with line 84, formed by second portion 46 of blades 40, 41, and 42, closer to periphery 50 than that of a circular arc 94, which is tangent with line 84 at point 95 and which is also tangent to periphery 50 at point 82, said circular arc 94 having its center at a point 96 on radius line 87. This is illustrated by radius line 98, which interconnects periphery 50 and point 83 with central axis 21, being shorter than radius line 97, which interconnects periphery 50 and point 95 with central axis 21.

Curve 80, which represents the curved portion 45 of blades 40, 41, and 42, is not tangent to periphery 50 at point 82 which represents outer edge 43, but meets periphery 50 at a slight angle, which is greater than 2° and preferably about 6°. Curved portion 45 of blade 40, 41, and 42 also results in blades 40, 41, and 42 having a depth defined as a distance $d_6$, which in a preferred embodiment is $0.135D_1$ and which is the distance between line 84 representing second portion 46 and line 71, which runs parallel to line 84 and passes through point 82.

The preferred relative orientation of blades 40, 41, and 42 to inner vane structure 26 is one in which edge 68 of each vane portion 60, 61 and 62 is a distance $d_7$, which in a preferred embodiment is $0.07D_1$, from radius line 87 of the associated blade 40, 41 and 42. This distance must fall within the range of $0.055D_1$ and $0.085D_1$ in order that the inner vane structure 26 not to impede efficiency of rotor 20.

By way of illustration only, proportions for rotor 20 of high efficiency and therefore of a preferred embodiment have been provided and are summarized as follows, all measurements being given in terms of $D_1$ of rotor 20, since it is contemplated that rotor 20 may be constructed of various sizes:

$D_1 = D_1$
$D_2 = 1.05D_1$
$D_3 = 0.44D_1$
$D_4 = 0.1D_1$
$d_1 = 0.115D_1$
$d_2 = 0.25D_1$
$d_3 = 0.1D_1$
$d_4 = 0.1D_1$
$d_5 = 0.15D_1$
$d_6 = 0.135D_1$
$d_7 = 0.07D_1$

In this preferred embodiment arrangement, angle $A_1$ is about 94° but in any case is preferably greater than 60°.

The operation of the present invention will now be described with particular reference to FIG. 4. Wind travelling in a direction 100 relative to rotor 20 enters rotor 20 and follows three paths, 101, 102, and 103, through the rotor.

Wind following path 101 over the convex side of curve 80 and along line 84 creates a suction which generates a pulling force on blades 40, 41, and 42, while wind following paths 102 and 103 under the concave side of curve 80 creates a pushing force. Blades 40, 41, and 42 at curve 80 act as vertical air foils. The highest intensity of force applied on blades 40, 41, and 42 is at the point of sharpest curvature. For maximum power it is therefore best to have the sharpest curvature as near to periphery 50 as possible. In addition, it is important blades 40, 42, and 42 have a large blade depth so more wind will be caught on the concave side of the curve 80.

To accomplish the above objectives, curve 80 should be of a fairly large radius at the periphery 50, with the radius generally getting smaller as the curve 80 approaches the point of tangency 83 with line 84. This is the reason for forming curved portion 45 as curve 80 of a skewed ellipse 81 as illustrated in FIGS. 5 through 7. In addition, in order to provide more efficiency, line 84 should be fairly long since flow along line 84 creates additional pull along the convex side of blades 40, 41, and 42.

Inner vane structure 26 splits the wind on the concave side of blades 40, 41, and 42 into two paths 102 and 103. This eliminates a certain amount of the drag which is generated on the concave side of blades 40, 41, and 42 facing into the wind, thereby increasing the efficiency of rotor 20. It was discovered by trial and error that the location of edge 68 of vane portions 60, 61, and 62 must be between $0.055D_1$ and $0.085D_1$ in distance from adjacent radius line 87 so as not to impede efficiency. Note that although the preferred embodiment has inner vane structure 26, the present invention will function without inner vane structure 26.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A turbine apparatus for utilization of the kinetic energy of moving air or fluid, comprising:
   (a) a support member;
   (b) a rotor mounted on said support member for rotation about said rotor's central axis, said rotor having three blades disposed symmetrically about said central axis, each of said blades having an outer edge and an inner edge with respect to said central axis, and further having a first curved portion and a second portion, said curved portion beginning at said outer edge and terminating at said second portion with said curved portion defining a surface generally concave with respect to said central axis, said curved portion having a radius of curvature which becomes progressively less from said outer edge to said second portion, said second portion extending from said curved portion and terminating at said inner edge, said inner edge lying in a first plane containing said central axis, said first plane disposed at an angle greater than 60° measured about said central axis from a second plane containing said outer edge and said central axis; and
   (c) means connected to said rotor for converting rotation of said rotor to usable energy.

2. A turbine apparatus in accordance with claim 1, wherein said second portion is substantially planar and lies in a third plane that intersects said second plane at a point beyond said outer edge whereby the distance between said third plane and said second plane is greater at said inner edge than at the point where said curved portion terminates and said substantially planar portion begins.

3. A turbine apparatus in accordance with claim 1, wherein said rotor further comprises an inner vane structure having three vane portions disposed about said central axis, said vane portions extending generally outward from said central axis, each vane portion associated with one of said blades and lying in a fourth plane associated with one of said blades.

4. A turbine apparatus in accordance with claim 3, wherein each of said vane portions has an outer edge disposed in said fourth plane, said outer edge spaced apart from said second plane in a direction normal to said second plane at a distance between $0.055D_1$ and $0.085D_1$ from said second plane where $D_1$ is the diameter of a first circle containing said outer edges of said blades and having its center on said central axis.

5. A turbine apparatus in accordance with claim 4, wherein said vane portions are disposed symmetrically about said central axis and are defined generally as extended sides of an equilateral triangle centered about said central axis, each vane portion defining said fourth plane such that said fourth plane intersects said curved portion of said associated blade.

6. A turbine apparatus in accordance with claim 4, wherein said curved portion of said blade terminates and is tangent to said substantially planar portion of said blade at a point which is closer to the outer circumference of said first circle than the point of tangency of a second circle with said substantially planar portion, said second circle having its center at a point on a line extending from said central axis to said outer edge of said blade and tangent at said outer edge to said first circle.

7. A turbine apparatus in accordance with claim 6, wherein said curved portion and said first circle meet so as to form an angle greater than 2° and less than 10°.

8. A turbine apparatus for utilization of the kenetic energy of moving air or fluid, comprising:
   (a) a support member, said support member having a central vertical axis;
   (b) a rotor structure mounted on said support member for rotation about said vertical axis;
   (c) said rotor including three generally vertically upright blade-like members fixedly disposed symmetrically about said central axis;
   (d) each of said blade-like members including an outer edge at the circumference of said rotor and an inner edge, said outer edge being further removed from said axis than said inner edge;
   (e) each of said blade-like members further including a curved portion and a generally planar portion;
   (f) said curved portion extending from said outer edge to said planar portion, said curved portion defining a surface generally concave on the side of said curved portion facing said central axis, said curved portion having a variable radius of curvature which become progressively less from said outer edge to said planar portion, whereby the depth of the blade is increased thereby allowing more moving air to be caught by said curved portion and directed along said generally planar portion so as to increase the efficiency of the turbine apparatus, said curved portion intersecting the circumference of said rotor at an angle greater than 2°;
   (g) said generally planar portion extending from said curved portion to said inner edge, said generally planar portion being of greater radial extent than said curved portion, said inner edge being angularly displaced by an angle greater than 60° as measured about said central axis from a radius extending through said outer edge and said central axis, whereby said generally planar portion has an extended surface along which the air moves thereby increasing the efficiency of the rotor; and
   (h) means connected to said rotor for converting rotation of said rotor to usable energy.

9. A turbine apparatus in accordance with claim 8, wherein said rotor further includes an inner vane structure having three generally vertical planar vane portions symmetrically disposed about said central axis, said vane portions being defined in horizontal cross-sections generally as extended sides of an equilateral triangle centered about said central axis, each of said vane portions being associated with one of said blade-like members, each of said vane portions including an outer end displaced from the radius interconnecting said outer edge of said associated blade-like member and said central axis, by a distance between 0.055 and 0.085 of the diameter of said rotor.

10. A turbine apparatus for utilization of the kenetic energy of moving air or fluid, comprising:

(a) a support member;
(b) a rotor mounted on said support member for rotation about a central axis;
(c) said rotor including a plurality of blades disposed symmetrically about said central axis and an inner vane structure including a plurality of planar vane portions also disposed symmetrically about said central axis;
(d) said vane portions being defined in horizontal cross-sections generally as extended sides of an equilateral triangle centered about said central axis, each of said vane portions being associated with one of said blades, said vane portions thereby cooperating with said blades to define flow paths through said rotor;
(e) each of said blades having an outer edge at the circumference of said rotor and an inner edge in the interior of said rotor and further having a first curved portion and a second portion;
(f) said curved portion extending from said outer edge to said planar portion, said curved portion defining a surface generally concave with respect to said central axis, said curved portion having a radius of curvature which becomes progressively less from said outer edge to said planar portion, said curved portion intersecting the circumference of said rotor at an angle greater then 2°;
(g) said second portion extending from said curved portion to said inner edge, said inner edge being angularly displaced about said central axis more than 60° from a radius extending through said outer edge and said central axis; and
(h) means connected to said rotor for converting rotation of said rotor to usable energy.

11. A turbine apparatus in accordance with claim 10, wherein said second portion is further removed from said radius at said inner edge than at the point of intersection with said curved portion.

* * * * *